US009444860B1

(12) United States Patent
Jammula et al.

(10) Patent No.: US 9,444,860 B1
(45) Date of Patent: Sep. 13, 2016

(54) METHOD AND SYSTEM FOR DATA DRIVEN CHECKLIST SHARING

(71) Applicants: Navin Kumar Jammula, Orissa (IN); Venkatesan Murugesan, San Jose, CA (US); Elaine Chong, Mountain View, CA (US); Krishnaveni Edunuru, Cupertino, CA (US)

(72) Inventors: Navin Kumar Jammula, Orissa (IN); Venkatesan Murugesan, San Jose, CA (US); Elaine Chong, Mountain View, CA (US); Krishnaveni Edunuru, Cupertino, CA (US)

(73) Assignee: Intuit Inc., Mountain View, CA (US)

( * ) Notice: Subject to any disclaimer, the term of this patent is extended or adjusted under 35 U.S.C. 154(b) by 189 days.

(21) Appl. No.: 14/170,448

(22) Filed: Jan. 31, 2014

(51) Int. Cl.
*G06F 3/048* (2013.01)
*H04L 29/06* (2006.01)
*G06F 3/0481* (2013.01)
*G06F 3/0482* (2013.01)
G06Q 10/06 (2012.01)
G06Q 30/06 (2012.01)
*G06F 3/0484* (2013.01)

(52) U.S. Cl.
CPC ........... *H04L 65/403* (2013.01); *G06F 3/0481* (2013.01); *G06F 3/0482* (2013.01); *G06Q 10/06316* (2013.01); *G06Q 30/0633* (2013.01); *G06F 3/0484* (2013.01); *G06Q 10/06* (2013.01); *G06Q 10/06311* (2013.01); *G06Q 10/063114* (2013.01); *G06Q 30/0641* (2013.01); *G06Q 30/0643* (2013.01)

(58) Field of Classification Search
CPC .. G06F 3/0481; G06F 3/0484; G06F 3/0482; H04L 65/403; G06Q 30/0633; G06Q 30/0643; G06Q 30/0641; G06Q 10/06; G06Q 10/06316; G06Q 10/06311; G06Q 10/063114

See application file for complete search history.

(56) References Cited

U.S. PATENT DOCUMENTS

| 5,432,925 A * | 7/1995 | Abraham .............. G06F 9/4428 719/316 |
| 5,734,899 A * | 3/1998 | Yoshizawa ................ G06F 8/71 |
| 5,832,268 A * | 11/1998 | Anderson .............. G06F 9/443 707/999.104 |
| 6,012,081 A * | 1/2000 | Dorn ....................... G06F 9/465 710/260 |
| 8,253,728 B1 * | 8/2012 | Sullivan .................. G06T 19/00 345/419 |
| 2006/0053075 A1 * | 3/2006 | Roth ....................... G06Q 10/06 705/50 |
| 2007/0055564 A1 * | 3/2007 | Fourman ................. G06Q 10/10 705/7.39 |
| 2007/0143425 A1 * | 6/2007 | Kieselbach ......... G06F 17/2288 709/206 |
| 2008/0301142 A1 * | 12/2008 | Marolf ................... G06Q 10/06 |
| 2011/0016023 A1 * | 1/2011 | Zakas ................ G06Q 30/0641 705/27.1 |
| 2012/0047082 A1 * | 2/2012 | Bodrozic ............... G06Q 50/16 705/314 |
| 2014/0006943 A1 * | 1/2014 | Robbins ................ G06F 19/327 715/273 |
| 2014/0172513 A1 * | 6/2014 | MacLean ............. G06Q 30/018 705/7.39 |
| 2014/0281967 A1 * | 9/2014 | Bodnick ................ G06Q 10/10 715/708 |

* cited by examiner

*Primary Examiner* — Patrick Riegler
(74) *Attorney, Agent, or Firm* — Osha Liang LLP (57) ABSTRACT

A method for checklist sharing. The method includes monitoring actions of a user on a computer device, identifying an action of the user, identifying a transaction record based on the action, identifying a checklist based on the transaction record, sending a notification of the checklist to the user, receiving, from the user, a download request to download the checklist, and providing the download of the checklist to the user.

22 Claims, 7 Drawing Sheets

METHOD AND SYSTEM FOR DATA DRIVEN CHECKLIST SHARING

BACKGROUND

Task management software applications offer checklist creation for users. A checklist is used by a user to organize a life event, such as planning a wedding and starting a business. However, a checklist created by a user in a task management software application may be used solely by the user. Rather than using the checklist, another user may then reinvent the wheel and create another checklist. Moreover, a user may benefit from a checklist, but may not be aware that the checklist exists in a task management software application.

SUMMARY

In general, in one aspect, the invention relates to a method for checklist sharing. The method includes monitoring actions of a user on a computer device, identifying an action of the user, identifying a transaction record based on the action, identifying a checklist based on the transaction record, sending a notification of the checklist to the user, receiving, from the user, a download request to download the checklist, and providing the download of the checklist to the user.

In general, in one aspect, the invention relates to a computer readable medium storing instructions for checklist sharing, the instructions including functionality for: monitoring actions of a user on a computer device, identifying an action of the user, identifying a transaction record based on the action, identifying a checklist based on the transaction record, sending a notification of the checklist to the user, receiving, from the user, a download request to download the checklist, and providing the download of the checklist to the user.

In general, in one aspect, the invention relates to a system for checklist sharing. The system includes a computer processor, a checklist application system, executing on the computer processor, configured to monitor actions of a user on a computer device, identify an action of the user, identify a transaction record based on the action, identify a checklist based on the transaction record, send a notification of the checklist to the user, receive, from the user, a download request to download the checklist, and provide the download of the checklist to the user. The system further includes a data repository configured to store transactions records, wherein each transaction record includes financial data of users, store templates of checklists, and store checklists.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for sharing checklists. Specifically, embodiments of the invention automatically notify a user of a checklist based on an action of the user on a computer device. The actions of a user are monitored to identify an action that triggers a search of stored checklists. A checklist may be identified based on mined transaction records. In one or more embodiments of the invention, user preferences may refine the search of stored checklists.

Figure 1:
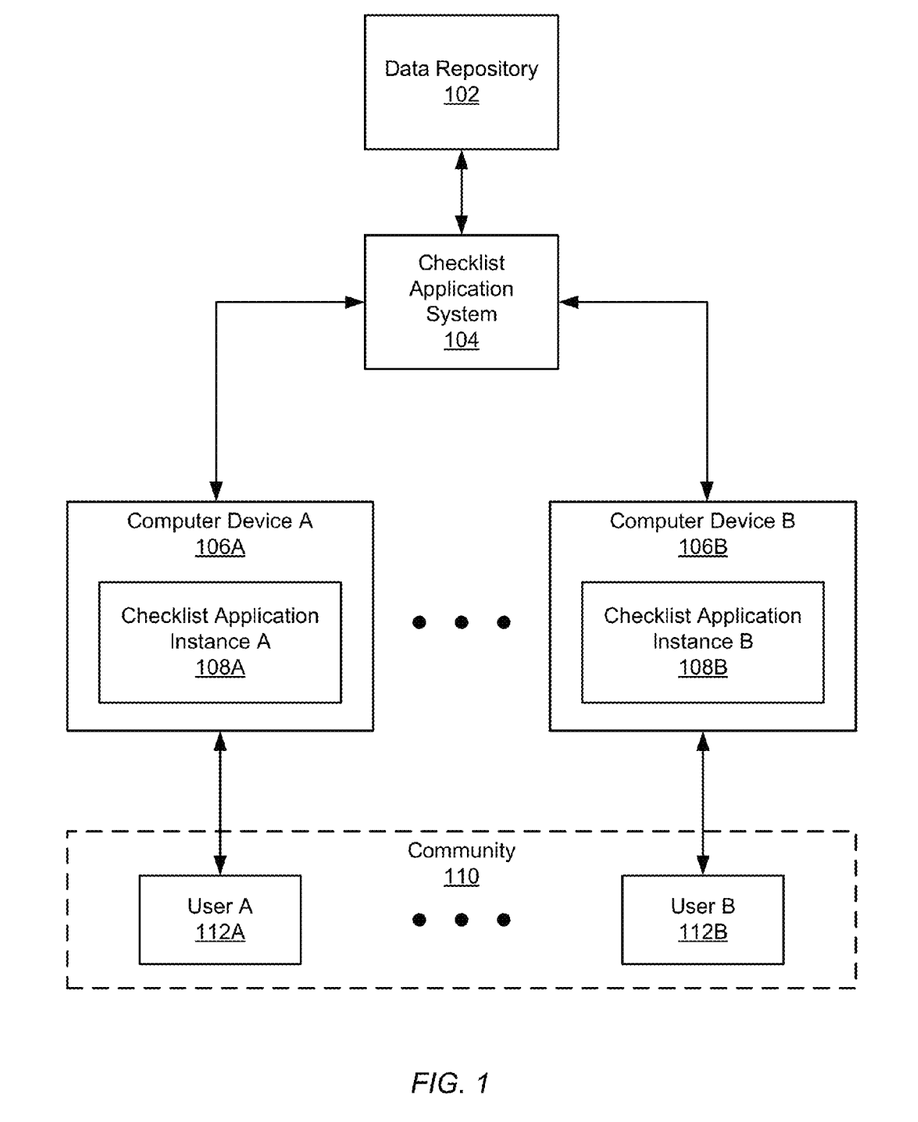
FIG. 1 shows a schematic diagram of a system in accordance with one or more embodiments of the invention.

FIG. 1 shows a schematic diagram of a system in accordance with one or more embodiments of the invention. As shown in FIG. 1, the system includes a data repository (102), a checklist application system (104), one or more computer devices (e.g. computer device A (106A), computer device B (106B)), one or more checklist application instances (e.g. checklist application A (108A), checklist application B (108B)), a community (110), and one or more users (e.g. user A (112A), user B (112B)) in accordance with one or more embodiments of the invention. Each of these components is described below.

In one or more embodiments of the invention, the data repository (102) is any type of storage unit and/or device (e.g., a file system, database, collection of tables, or any other storage mechanism) for storing data. Further, the data repository (102) may include multiple different storage units and/or devices. The multiple different storage units and/or devices may or may not be of the same type or located at the same physical site. The data repository (102) may be stored on a local server, as memory stored in a cloud computing environment or on a remote server. Examples of data stored by the data repository (102) are shown and discussed in relation to FIG. 2.

In one or more embodiments of the invention, the checklist application system (104) monitors the actions of a user on a computer device. A user performs multiple actions on a computer device. In one embodiment of the invention, an action may correspond to a user's use of a computer device. Exemplary actions of a user on a computer device include, but are not limited to, using a computer application, performing financial transactions, sending an email, setting a location on a map application using the GPS of a mobile device, or any action a user is capable of performing on a computer device. For example, the checklist application system (104) may monitor the user's use of an Internet browser application to perform a search in a search engine. In one or more embodiments of the invention, the checklist application system (104) mines data in the data repository (102) based on actions of a user. The checklist application system (104) searches the checklists to identify a checklist or a subset of a single or multiple checklists. In one or more embodiments of the invention, the checklists are identified based on the data in the data repository (102) (discussed in FIG. 2).

Figure 2:
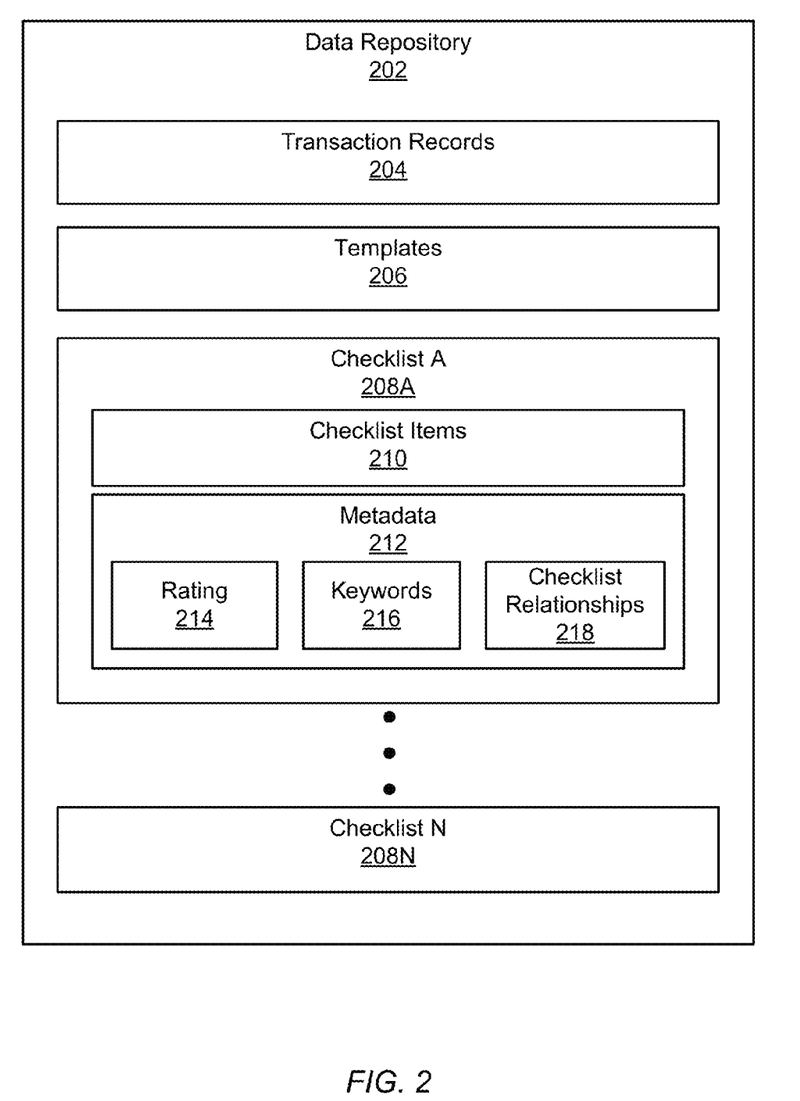
FIG. 2 shows a schematic diagram of a data repository in accordance with one or more embodiments of the invention.

In one or more embodiments of the invention, the checklist application system (104) may include functionality to learn a user's preference based on the checklists downloaded by the user and the checklists ignored by the user. The search of the checklists to identify a checklist or subset of a single or multiple checklists may then be based on the mined data in the data repository (102) and the user's preferences. For example, a user that downloaded a checklist of how to prepare for hiking in Vancouver over a checklist of things to do in downtown Vancouver may be notified of a checklist of hiking preparation the next time the user is in a hiking region. The checklist application system (104) triggers a notification of the checklist or subset of checklists to an instance of the checklist application of a user (described below). In one or more embodiments of the invention, the checklist application system (104) retrieves the checklist or subset of multiple checklists from the data repository (102) based on a user's request to download the checklist. The checklist application system (104) may execute in a cloud computing or a server environment. In one embodiment of the invention, the checklist application system (104) executes one or more instances of the checklist application.

In one or more embodiments of the invention, one or more instances of the checklist application (e.g. checklist application instance A (108A), checklist application instance B (108B)) are configured to display a notification that a download of a checklist exists, store checklists downloaded by a user, and provide a user interface (not shown). In one or more embodiments of the invention, the notification informs a user about the existence of a checklist. The notification is sent by the checklist application system (104) to a checklist application instance executing on a computer device. The notification may be in the form of text, a message, an email, a link to the checklist application instance, or any suitable form where the user is given notice. In one or more embodiments of the invention, the notification may be displayed while a checklist application instance is executing in the background of the computer device or while the checklist application instance is executing in the foreground on the computer device. In one or more embodiments of the invention, a checklist application instance stores one or more checklists downloaded by the user directly (as physical memory) or indirectly (as a data structure used by software or as memory stored in a cloud computing environment) on the computer device.

In one or more embodiments of the invention, the user interface (not shown) of one or more instances of the checklist application is any sort of interface, including a graphical user interface. The user interface includes, but is not limited to, functionality to receive inputs from a user to create a checklist, accept a download a checklist, ignore a download of a checklist, submit a checklist, submit a rating of a downloaded checklist (discussed in FIG. 2), modify a downloaded checklist, and submit a modified checklist. A checklist application instance is executed by a user, either locally or via a computer network (not shown). A computer network may include local area network, wide area network, Internet, mobile phone network, WIFI, or any other suitable wired and/or wireless data network similar to the network shown and described in relation to FIG. 7. In one or more embodiments of the invention, a user (e.g. user A (112A), user B (112B)) is a user of one or more instances of a checklist application. Although not explicitly shown, multiple users may exist, each using a respective computer device to execute a respective checklist application instance. The users form a community (110). The community (110) includes the users (e.g. user A (112A), user B (112B)) of the checklist application instances as well as possibly other interested and/or qualified individuals.

In one or more embodiments of the invention, the computer devices (e.g. computer device A (106A), computer device B (106B)) are any type of computing device of a user capable of processing data. For example, the computer device may include, but is not limited to, a mobile device, a laptop computer, a desktop computer, personal digital assistant, gaming console, smart phone, computing spectacles/glasses, or a tablet. Although not shown in FIG. 1, users may have multiple computer devices. For example, user A (112A) may use one computer device to run the checklist application instance A (108A) and another computer device to instant message friends to discuss the contents of the checklist.

While FIG. 1 shows a configuration of components, other configurations may be used without departing from the scope of the invention. For example, various components may be combined to create a single component. As another example, the functionality performed by a single component may be performed by two or more components.

FIG. 2 shows a schematic diagram of a data repository in accordance with one or more embodiments of the invention. As shown in FIG. 2, the data repository (202) includes transaction records (204), templates (206), and checklists (checklist A (208A) and checklist N (208N)) in accordance with one or more embodiments of the invention. Each of these components is described below.

In one or more embodiments of the invention, transaction records (204) may include, but are not limited to, personal financial data and small business financial data within financial products (both personal and business facing) including Intuit® products, such as Quickbooks®, Quicken®, Intuit Financial Services™, Paper Trail™, and Inventory Tracker™. These trademarks are those of Intuit, Inc. of Mountain View, Calif. Exemplary financial data include, but are not limited to, purchases, loans, budget plans, emails, a calendar in Quicken®, or any financial data that may be mined by the checklist application system. For example, a transaction record may be a user's car payments that are part of the user's budget in Quicken®.

In one or more embodiments of the invention, templates (206) are files that may serve as the starting point for the creation of a checklist by a user. For example, the template may be an editable word processing document with built-in formatting that may not be modified by a user, such as layout of the document, font size and style. In one or more embodiments of the invention, the checklist application system may retrieve a checklist template from the data repository (202) to the checklist application instance of a user.

In one or more embodiments of the invention, each checklist of the checklists stored in the data repository (102) (i.e. checklist A (208A)-checklist N (208N)) include checklist items (e.g. checklist items (210)) and metadata (e.g. metadata (212)). In one or more embodiments of the invention, a checklist item is a word or phrase representing a component of a checklist. For example, a checklist item of a "how to maintain a car" checklist may be change your oil in 3 months or after 3000 miles. In one or more embodiments of the invention, metadata is data that represents a set of data. Metadata or the set of data includes a rating (e.g. rating (214)), keywords (e.g. keywords (216)), and checklist relationships (e.g. checklist relationships (218)).

In one or more embodiments of the invention, a rating (e.g. rating (214)) is an evaluation of a checklist defined by users of the checklist application instances. Specifically, users of the checklist application instances review a checklist and submit a rating of the checklist to the checklist application instances. For example, the rating may be a numeric value that defines how much the content of the checklist is useful to the user. The rating may correspond to the average of the ratings provided by each user. In one embodiment of the invention, the rating may correspond to the average of the ratings provided by each user and the number of downloads of a checklist.

In one or more embodiments of the invention, keywords (e.g. keywords (216)) are words or phrases that describe the contents of a checklist. The keywords may correspond to the words or phrases in the title of the checklist. The keywords may also correspond to words or phrases that are in the contents of a checklist multiple times. For example, a "how to prepare for a fishing trip" checklist includes checklist items: (1) buy a fishing rod; and (2) buy fishing bait. A keyword of the "how to prepare for a fishing trip" checklist may be fishing as it appears multiple times in the contents of the how to prepare for a fishing trip checklist.

In one or more embodiments of the invention, checklist relationships (e.g. checklist relationships (218)) are the connections of a checklist to other checklists including, but not limited to, parent, child, and grandchild. For example, a user may download a "how to sew" checklist and modify the "how to sew" checklist to a "how to sew for beginners" checklist. Since the "how to sew for beginners" checklist is based on the "how to sew" checklist, the "how to sew for beginners" checklist is the child of the "how to sew" checklist. Similarly, the parent of the "how to sew for beginners" checklist is the "how to sew checklist".

In one or more embodiments of the invention, the checklist relationships of the checklists in the data repository (202) may be used to create a display (in the form of a web or similar) of checklists to provide a method to search or be notified of the checklists. Each web of checklists includes checklists that are related to one another. For example, a user's action of purchasing traveler's insurance for a trip to Florida may identify a "things to do in Florida" checklist that has multiple children in the checklist relationships in the metadata of the "things to do in Florida" checklist. The user may then be notified of the "things to do in Florida" checklist and the multiple children checklists.

While FIG. 2 shows a configuration of components, other configurations may be used without departing from the scope of the invention. For example, various components may be combined to create a single component. As another example, the functionality performed by a single component may be performed by two or more components.

Figure 3:
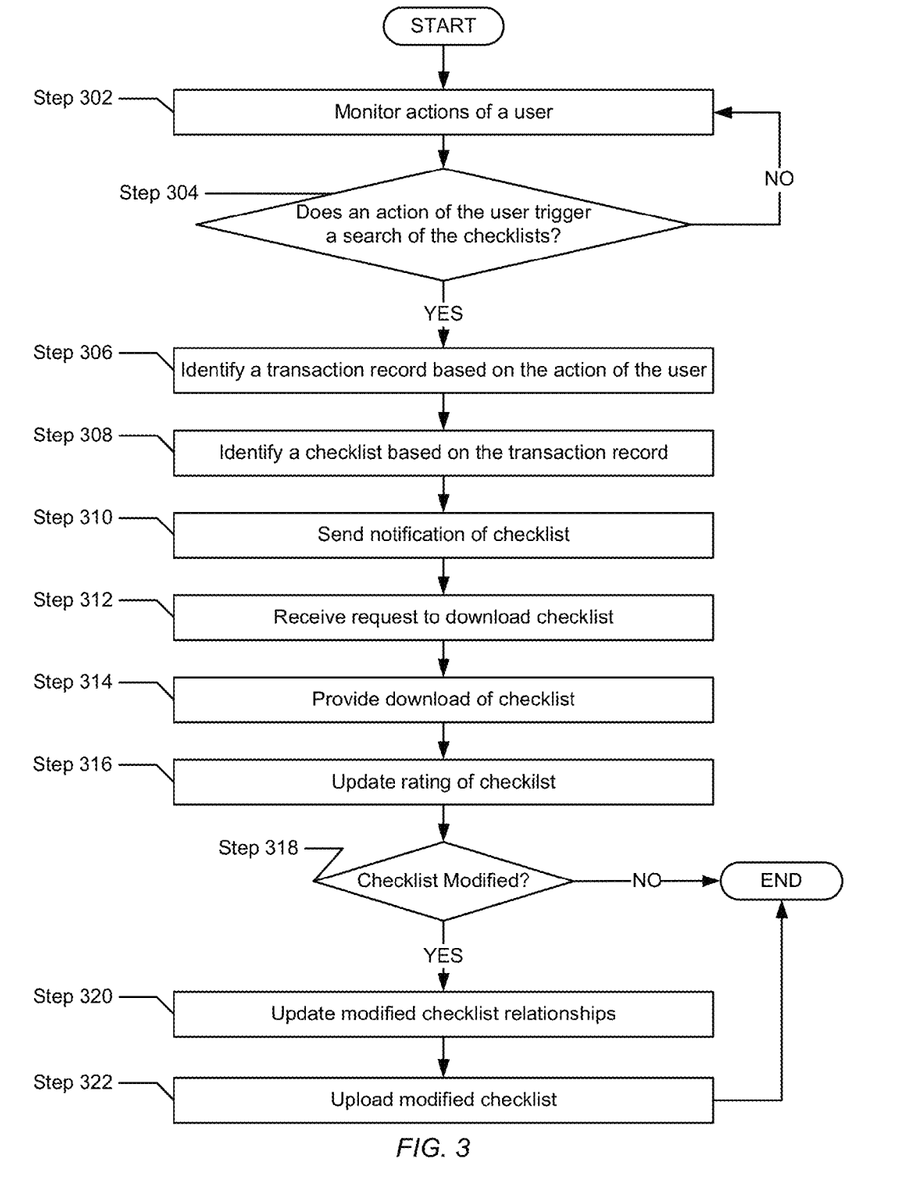
FIGS. 3 and 4 show flow charts of methods in accordance with one or more embodiments of the invention.
Figure 4:
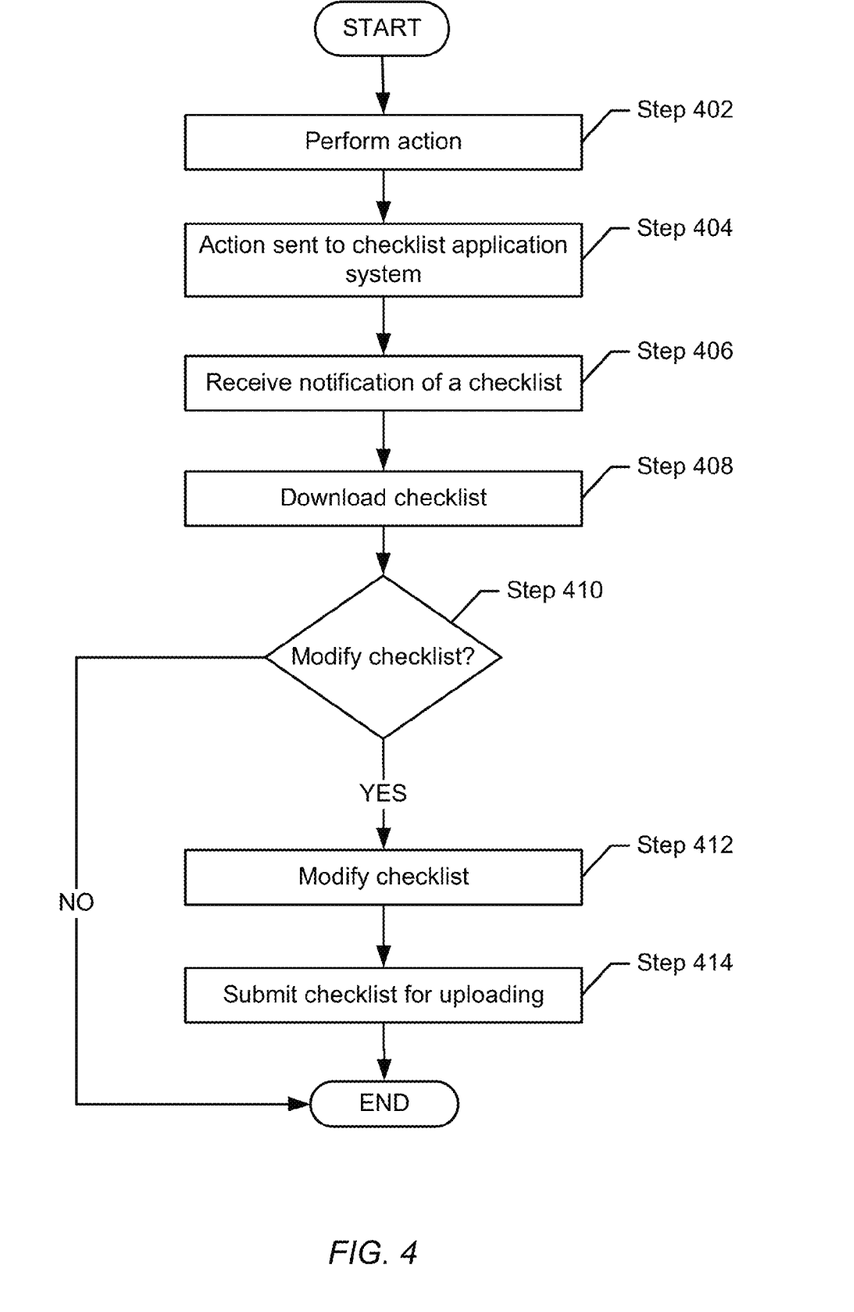

FIGS. 3 and 4 show flow charts of methods in accordance with one or more embodiments of the invention. In one or more embodiments of the invention, one or more of the steps shown in FIGS. 3 and 4 may be omitted, repeated, and/or performed in a different order than the order shown in FIGS. 3 and 4. Accordingly, the scope of the invention should not be considered limited to the specific arrangement of steps shown in FIGS. 3 and 4.

Turning to FIG. 3, in Step 302, the actions of a user are monitored in accordance with one or more embodiments of the invention in accordance with one or more embodiments of the invention. Exemplary actions of a user on a computer device include, but are not limited to, using a computer application, making financial transactions, sending an email, setting a location on a GPS of a mobile device, or any action a user is capable of performing on a computer device. For example, an action may be a user's use of a global positioning system (GPS) application on a mobile device or an event a user schedules in a calendar on a laptop computer. In one or more embodiments of the invention, the actions of a user may be monitored by the checklist application system. In one or more embodiments of the invention, the actions are monitored through an Application Programming Interface (API). Through the API, actions may be sent by the computer device (or particularly the computer application executing on the computer device) to the checklist application system that is listening for actions from a computer device. In one or more embodiments of the invention, a checklist application instance requests permission to monitor the actions of a user on a computer device when the checklist application instance is installed on the computer device.

In Step 304, a determination is made regarding whether an action of a user triggers a search of the checklists in accordance with one or more embodiments of the invention. In one or more embodiments of the invention, an action of a user that triggers a search of the checklists may be an action a user does not perform repeatedly. For example, the action of a user booking a flight to Spain has not occurred in the past and triggers a search of the checklists. However, the action of a user booking a flight to Ottawa happens each year and does not trigger a search of the checklists. If a determination is made that the action of the user does not trigger a search of the checklists, the method may return to Step 302 to continue to monitor the actions of a user.

Returning to Step 304, if a determination is made that the action of the user does trigger a search of the checklists, the method may proceed to Step 306 in accordance with one or more embodiments of the invention. In Step 306, a transaction record or a subset of transaction records are identified based on the action of the user. In one or more embodiments of the invention, the transaction records mined are based on matching action keywords to transaction keywords. Action keywords correspond to a word or phrase describing the action of the user. For example, the user action of booking a flight to Spain may have keywords flight to Spain that are searched against the transaction keywords of the transaction records. Transaction keywords correspond to a word or phrase in the contents of the transaction record. For example, the transaction record of a receipt of a flight booking from Washington, D.C. to Spain on Dec. 21, 2013 may have the keyword Spain that is searched against the user action keywords flight to Spain. In one or more embodiments of the invention, transaction records correspond to financial data within financial management products such as Intuit® products including, but not limited to, Quickbooks®, Quicken®, Intuit Financial Services™, Paper Trail™, and Inventory Tracker™. Exemplary financial data include, but are not limited to, purchases, loans, budget plans, emails related to Intuit products, a calendar in Quicken®, or any financial data within Intuit® products that may be mined by the checklist application system.

In Step 308, a checklist is identified based on the transaction records identified in Step 306 in accordance with one or more embodiments of the invention. In one or more embodiments of the invention, a checklist is identified by the checklist application system by matching keywords in the metadata of a checklist in the data repository to transaction keywords in the transaction records in the data repository. In one or more embodiments of the invention, a checklist is identified by the application system by the checklist relationships in the metadata of a checklist in the data repository. In one or more embodiments of the invention, the search of the checklists to identify a checklist may be refined by the checklist application system by learning user preferences of the user. User preferences may include, but are not limited to, settings set by the user in the checklist application instance of the user and checklist downloads previously accepted and ignored by the user. For example, a user may ignore notifications of checklists that include shopping. The checklist application system may then exclude checklists with keywords that include shopping in the search of the checklists. In one or more embodiments of the invention, a subset of checklists is identified. The subset of checklists may be applicable to the action of the user. For example, a user traveling to Vancouver may be notified of the following checklists: (1) things to do in downtown Vancouver; (2) hiking in Vancouver; (3) preparing to move to Vancouver; (4) restaurants to try in Vancouver; and (5) how to find a job in Vancouver.

In Step 310, a notification of a checklist or a subset of checklists is sent in accordance with one or more embodiments of the invention. In one or more embodiments of the invention, the notification is sent to a user of a checklist application instance. The user then makes a selection to accept the download of a checklist or ignore the download of a checklist. The notification may be in the form of text, a message, an email, a link to the checklist application instance, or any suitable form where the user is given notice of a checklist.

In Step 312, a request to download a checklist is received in accordance with one or more embodiments of the invention. Prior to receiving the request to download a checklist, the user receives a notification of a checklist (see Step 310) and accepts the download of the checklist. In Step 314, the download of a checklist is provided to a user of the checklist application instance. In one or more embodiments of the invention, issuing the request to download a checklist and providing the download of a checklist to a user may occur using an API.

In Step 316, the rating of the checklist is updated in accordance with one or more embodiments of the invention. In one or more embodiments of the invention, the rating corresponds to an evaluation of the checklist defined by users of the checklist application instances. The rating may be in the form of an alphanumerical value, a five star rating, or any suitable form that evaluates how useful the contents of a checklist are to a user. Users of the checklist application instances may review a checklist and submit a rating of the checklist to the checklist application instances. The rating may correspond to the average of the ratings provided by each user. The rating of the checklist is updated to include the user's rating that requested the download of a checklist in Step 312. In one or more embodiments of the invention, the rating may correspond to the average of the ratings provided by each user and the number of downloads of a checklist. The user that requested the download of the checklist in Step 312 may not submit a rating of the checklist. However, the number of downloads increases by one and the rating is updated to reflect the increase in the number of downloads.

In Step 318, a determination is made regarding whether the checklist is modified in accordance with one or more embodiments of the invention. The user may download a checklist or items on a checklist then choose to modify the checklist. The user may then submit a request to upload the modified checklist.

If a determination is made that the checklist is modified, the method may proceed to Step 320 in accordance with one or more embodiments of the invention. In one or more embodiments of the invention, a checklist is modified if a user submits a modified checklist after downloading the checklist. In Step 320, the checklist relationships in the metadata of the modified checklist are updated to include the checklist as the parent of the modified checklist. Further, the checklist relationships may be updated to include any children of the checklist as siblings of the modified checklist. The checklist relationships in the metadata of the checklist are modified to include the modified checklist as a child of the checklist.

In Step 322, the modified checklist is uploaded in accordance with one or more embodiments of the invention. In one or more embodiments of the invention, the modified checklist is stored in the data repository. The modified checklist may be mined by the checklist application system to notify another user of the modified checklist.

Turning to FIG. 4, in Step 402, a user performs an action in accordance with one or more embodiments of the invention. Exemplary actions of a user on a computer device include, but are not limited to, using a computer application, performing financial transactions, sending an email, setting a location within a map application using a GPS of a mobile device, or any action a user is capable of performing on a computer device. In one or more embodiments of the invention, the action in Step 402 is an action that does not occur repeatedly for the user. For example, an action that does not occur repeatedly is the user purchasing the user's first car.

In Step 404, the action is sent to the checklist application system in accordance with one or more embodiments of the invention. In one or more embodiments of the invention, the action is sent by the computer device (or particularly the computer application executing on the computer device) to the checklist application system through an API.

In Step 406, the user receives a notification of a checklist in accordance with one or more embodiments of the invention. In one or more embodiments of the invention, the user receives the notification of a checklist while the checklist application instance is running in the foreground or the background. The notification may be in the form of text, a message, an email, a link to the checklist application instance, or any suitable form where the user is given notice of a checklist. In one or more embodiments of the invention, the user may then accept the download of a checklist or ignore the download of a checklist.

In Step 408, the user downloads the checklist in accordance with one or more embodiments of the invention. In one or more embodiments of the invention, prior to downloading the checklist, the user accepts the download of the checklist. In one or more embodiments of the invention, a user receives the download of a checklist from the checklist application system through an API. In one or more embodiments of the invention the downloaded checklist is stored on the user's computer device.

In Step 410, a determination is made regarding whether the user modifies the checklist in accordance with one or more embodiments of the invention. If a determination is made that the user modifies the checklist, the method may proceed to Step 412 in accordance with one or more embodiments of the invention. In Step 412, the user modifies the checklist using the user interface of the checklist application instance. The user may modify the checklist by modifying the title of the checklist, deleting one or more checklist items from the checklist, adding one or more checklist items to the checklist, or editing the contents of one or more checklist items.

In Step 414, the user submits the checklist for uploading in accordance with one or more embodiments of the invention. In one or more embodiments of the invention, the user submits the modified checklist to the checklist application system for uploading the modified checklist into the data repository. In one or more embodiments of the invention, the user submits the modified checklist for uploading to share the modified checklist to other users of the checklist application instances.

Figure 5:
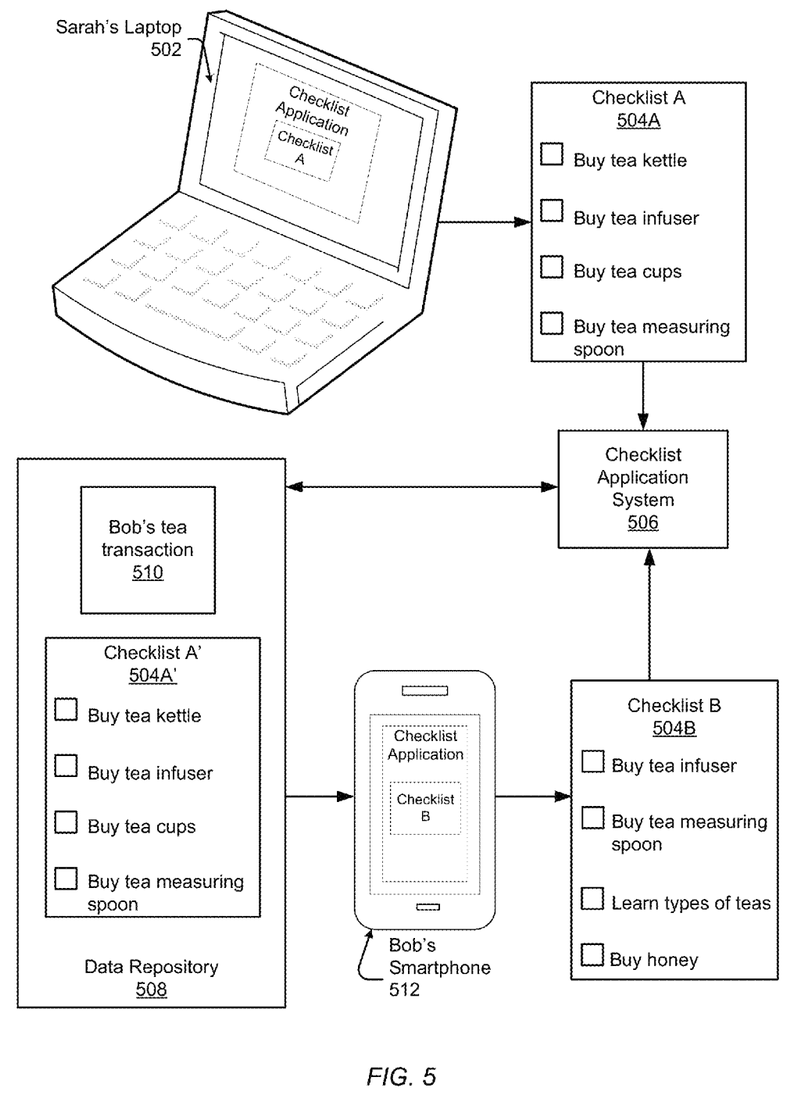
FIGS. 5 and 6 show examples in accordance with one or more embodiments of the invention.
Figure 6:
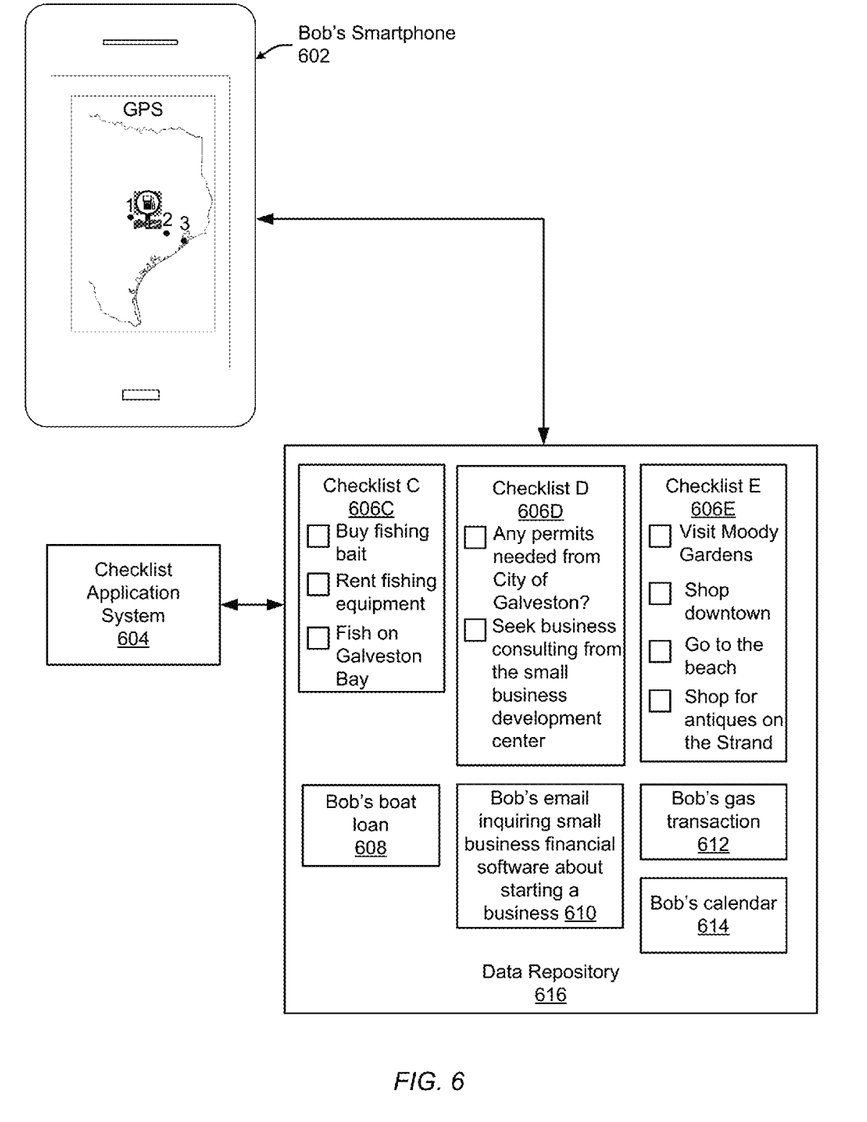

FIGS. 5 and 6 show examples in accordance with one or more embodiments of the invention. It will be apparent to one of ordinary skill in the art that the examples in FIGS. 5 and 6 are only representative examples and, as such, the invention should not be limited to the specific examples set forth in FIGS. 5 and 6.

In the example illustrated in FIG. 5, consider the scenario in which Bob performs an action to trigger a notification of checklist A (504) submitted by Sarah. Sarah creates checklist A (504A) on "how to create a tea collection" in a checklist application instance on Sarah's laptop (502). Checklist A (504A) includes the following checklist items: (1) buy tea kettle; (2) buy tea infuser; (3) buy tea cups; and (4) buy tea measuring spoon. Sarah then submits checklist A (504A) to the checklist application instance running on Sarah's laptop (502). The checklist relationships in the metadata of checklist A (504A), are empty, since checklist A is not derived from another checklist. The rating in the metadata of checklist A (504A) is also empty, since other users have not downloaded checklist A. The keyword in the metadata of checklist A (504A) is set to tea as tea appears frequently in the contents of checklist A. The checklist application system (506) receives checklist A (504A) and stores it in the data repository (508). Checklist A' (504A') may then be shared to different users of the checklist application instances based on the actions of the users.

Continuing with the example in FIG. 5, Bob decides to stop drinking coffee and try loose leaf tea for the first time. Bob performs the action of purchasing loose leaf tea from David's tea online. The checklist application system (506) is listening to Bob's actions. The checklist application system (506) mines transaction records in the data repository (508) based on Bob's purchase of loose leaf tea.

From Bob's purchases recorded in Bob's personal financial management software, the checklist application system (506) notes that Bob has not bought tea, excluding Bob's recent tea transaction from David's tea online. A search of the checklists in the data repository (508) is performed to identify a checklist for Bob. The keywords in the metadata of the checklists are compared to Bob's tea transaction (510). Checklist A' (504A') has a keyword of tea and is identified as matching Bob's tea transaction (510). Bob receives an email notification of checklist A' (504A'). Bob accepts the download of checklist items (2) and (4) of checklist A' (504A'). Bob submits a rating of checklist A' (504A') of 3/5. The rating in the metadata of checklist A' (504A') is updated to 3/5 as Bob is the first user of checklist A'. Checklist B (504B) is a modified version of checklist A' (504A'), since only checklist items (2) and (4) are downloaded to the checklist application instance on Bob's smartphone (512). Bob adds checklist items (3) learn types of teas and (4) buy honey. Bob then submits checklist B (504B) in the checklist application instance running on Bob's smartphone (512). The checklist relationships in the metadata of checklist B (504B) include checklist A' (504A') as the parent of checklist B, since checklist B is derived from checklist A'. The rating in the metadata of checklist B (504B) is empty, since checklist B has not been downloaded by other users. The keyword in the metadata of checklist B (504B) is set to tea as tea appears frequently in the contents of checklist B. The checklist application system (506) receives checklist B (504B) and stores it in the data repository (508). Checklist B' (504B') may then be shared to different users of the checklist application instances based on the actions of the users.

In the example illustrated in FIG. 6, consider the scenario in which Bob is notified of a subset of checklists based on actions performed by Bob. The checklist application system (604) is listening to Bob's smartphone (602). The checklist application system (604) first notes Bob's location is further than where Bob travels daily in Austin based on Bob's GPS on Bob's smartphone (602). The checklist application system (604) then notes that Bob stops to fill gas in Bob's car between Austin and Houston. The checklist application then mines the data repository (616) for Bob's transaction records. Bob's calendar in Bob's personal financial management software has an event for today marked as weekend trip to Galveston. The checklist application system (604) determines that Bob is on the way to Galveston from the combination of Bob's GPS location, Bob's gas transaction (612), and Bob's calendar (614). During the mining of Bob's transaction records in the data repository (616), the checklist application system (604) notes that a few days before leaving for Galveston, Bob took out a loan to make a boat purchase. Bob also sent an email to Intuit, Inc. inquiring about small business financial software to start a business. The checklist application system (604) then triggers a search of the checklists in the data repository (616).

Continuing with the example in FIG. 6, the checklist application system (604) mines the transaction records in the data repository (616) based on the actions performed by Bob, including Bob's GPS location, Bob's boat loan, Bob's email inquiring small business financial software about starting a business (610), Bob's gas transaction (612), and Bob's calendar (614). The checklist application system (604) identifies a subset of the checklists in the data repository (616), including checklist C (606C), checklist D (606D), and checklist E (606E). Checklist C (606C) is identified based on the keywords of fishing, boat, and Galveston in the metadata of checklist C matching Bob's transaction records, including Bob's boat loan (608), Bob's calendar (614), and Bob's gas transaction (612). Checklist D (606D) is identified based on the keywords of Galveston and business in the metadata of checklist D matching Bob's transaction records, including Bob's email inquiring small business financial software about starting a business (610), Bob's calendar (614), and Bob's gas transaction (612). Checklist E (606E) is identified based on the keywords of Galveston and shopping in the metadata of checklist E matching Bob's calendar (614) and Bob's gas transaction (612).

Continuing with the example in FIG. 6, Bob receives a notification of checklist C (606C), checklist D (606D), and checklist E (606E) on Bob's smartphone (602) as a text message. Bob ignores checklist D (606D), since Bob does not plan to open a small business in Galveston. Bob ignores checklist E (606E), since Bob does not enjoy shopping and touring Galveston. Bob accepts the download of checklist C (606C), since Bob is going to Galveston to try Bob's boat. The checklist application system (604) learns that Bob is not interested in opening a small business in Galveston and updates Bob's user preferences for subsequent checklist searches. The checklist application system (604) learns that Bob has a preference for nature activities over tourist activities, such as shopping, and updates Bob's user preferences for subsequent checklist searches.

Figure 7:
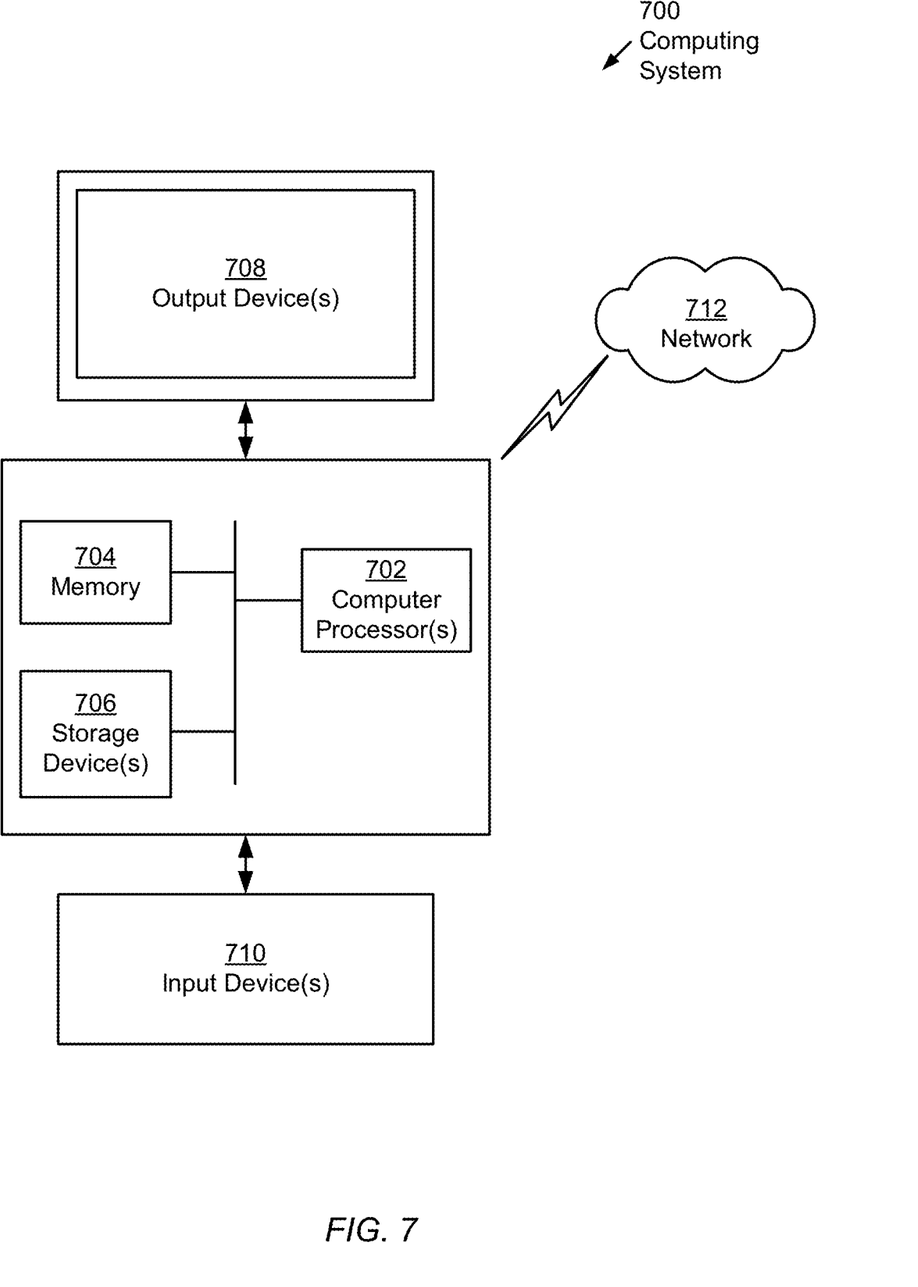
FIG. 7 shows a computing system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 7, the computing system (700) may include one or more computer processor(s) (702), associated memory (704) (e.g., random access memory (RAM), cache memory, flash memory, etc.), one or more storage device(s) (706) (e.g., a hard disk, an optical drive such as a compact disk (CD) drive or digital versatile disk (DVD) drive, a flash memory stick, etc.), and numerous other elements and functionalities. The computer processor(s) (702) may be an integrated circuit for processing instructions. For example, the computer processor(s) may be one or more cores, or micro-cores of a processor. The computing system (700) may also include one or more input device(s) (710), such as a touchscreen, keyboard, mouse, microphone, touchpad, electronic pen, or any other type of input device. Further, the computing system (700) may include one or more output device(s) (708), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (700) may be connected to a network (714) (e.g., a local area network (LAN), a wide area network (WAN) such as the Internet, mobile network, or any other type of network) via a network interface connection (not shown). The input and output device(s) may be locally or remotely (e.g., via the network (712)) connected to the computer processor(s) (702), memory (704), and storage device(s) (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (700) may be located at a remote location and connected to the other elements over a network (714). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for checklist sharing, comprising:
   monitoring a plurality of actions of a user on a computer device, the computer device comprising a processor and a global positioning system (GPS);
   identifying, by the processor, an action of the plurality of actions of the user, wherein the action indicates a location of the user determined by the GPS of the computer device;
   identifying a transaction record of a plurality of transaction records based on the action;
   identifying a checklist of a plurality of checklists based on the transaction record;
   sending a notification of identifying the checklist to the user;
   receiving, from the user, a download request to download the checklist;
   downloading the checklist to the user in response to the download request;
   receiving, from the user, a first upload request to upload a first modified checklist, wherein the first modified checklist is based on the checklist;
   in response to the first upload request:
      assigning a first checklist relationship to the first modified checklist, wherein the first checklist relationship defines the checklist to be a parent of the first modified checklist; and
      uploading the first modified checklist to a data repository that shares the first modified checklist with a plurality of users;
   receiving, from the user, a second upload request to upload a second modified checklist, wherein the second modified checklist is based on the first modified checklist; and
   in response to the second upload request:
      assigning a second checklist relationship to the second modified checklist, wherein the second checklist relationship defines the first modified checklist to be a parent of the second modified checklist; and
      uploading the second modified checklist to the data repository.

2. The method of claim 1, further comprising:
   prior to identifying the checklist based on the transaction record:
      learning a plurality of user preferences of the user; and
      refining a search of the plurality of checklists based on the plurality of user preferences.

3. The method of claim 1, further comprising:
   updating a rating of the checklist downloaded to the user.

4. The method of claim 1, wherein identifying the checklist based on the transaction record comprises identifying a subset of the plurality of checklists.

5. The method of claim 1,
   wherein the checklist comprises checklist items and a plurality of metadata,
   the plurality of metadata comprising a rating, a plurality of keywords, and checklist relationships.

6. The method of claim 5, wherein identifying the checklist based on the transaction record of the plurality of transaction records comprises matching a keyword of the plurality of keywords in the plurality of metadata of the checklist to a transaction keyword in the transaction record.

7. The method of claim 1, wherein the plurality of actions of the user comprises a use of a financial management application on the computer device.

8. A non-transitory computer readable medium storing a plurality of instructions for checklist sharing, the plurality of instructions comprising functionality for:

monitoring a plurality of actions of a user on a computer device, the computer device comprising a processor and a global positioning system (GPS);
   identifying, by the processor, an action of the plurality of actions of the user, wherein the action indicates a location of the user determined by the GPS of the computer device;
   identifying a transaction record of a plurality of transaction records based on the action;
   identifying a checklist of a plurality of checklists based on the transaction record;
   sending a notification of identifying the checklist to the user;
   receiving, from the user, a download request to download the checklist;
   downloading the checklist to the user in response to the download request;
   receiving, from the user, a first upload request to upload a first modified checklist, wherein the first modified checklist is based on the checklist;
   in response to the first upload request:
      assigning a first checklist relationship to the first modified checklist, wherein the first checklist relationship defines the checklist to be a parent of the first modified checklist; and
      uploading the first modified checklist to a data repository that shares the first modified checklist with a plurality of users;
   receiving, from the user, a second upload request to upload a second modified checklist, wherein the second modified checklist is based on the first modified checklist; and
   in response to the second upload request:
      assigning a second checklist relationship to the second modified checklist, wherein the second checklist relationship defines the first modified checklist to be a parent of the second modified checklist; and
      uploading the second modified checklist to the data repository.

9. The non-transitory computer readable medium of claim 8, wherein the plurality of instructions further comprises functionality for:
   prior to identifying the checklist based on the transaction record:
      learning a plurality of user preferences of the user; and
      refining a search of the plurality of checklists based on the plurality of user preferences.

10. The non-transitory computer readable medium of claim 8, wherein the plurality of instructions further comprises functionality for:
   updating a rating of the checklist downloaded to the user.

11. The non-transitory computer readable medium of claim 8, wherein identifying the checklist based on the transaction record comprises identifying a subset of the plurality of checklists.

12. The non-transitory computer readable medium of claim 8,
   wherein the checklist comprises checklist items and a plurality of metadata,
   the plurality of metadata comprising a rating, a plurality of keywords, and checklist relationships.

13. The non-transitory computer readable medium of claim 12, wherein identifying the checklist based on the transaction record comprises matching a keyword of the plurality of keywords in the plurality of metadata of the checklist to a transaction keyword in the transaction record.

14. The non-transitory computer readable medium of claim 8, wherein the plurality of actions of the user comprises a use of a financial management application on the computer device.

15. A system for checklist sharing, comprising:
   a computer processor;
   a data repository; and
   a checklist application system, executing on the computer processor, configured to:
      monitor a plurality of actions of a user on a computer device, the computer device comprising a global positioning system (GPS);
      identify an action of the plurality of actions of the user, wherein the action indicates a location of the user determined by the GPS;
      identify a transaction record of a plurality of transaction records based on the action;
      identify a checklist of a plurality of checklists based on the transaction record;
      send a notification of identifying the checklist to the user;
      receive, from the user, a download request to download the checklist;
      download the checklist to the user in response to the download request;
      receive, from the user, a first upload request to upload a first modified checklist, wherein the first modified checklist is based on the checklist;
      in response to the first upload request:
         assign a first checklist relationship to the first modified checklist, wherein the first checklist relationship defines the checklist to be a parent of the first modified checklist; and
         upload the first modified checklist to the data repository;
      receive, from the user, a second upload request to upload a second modified checklist, wherein the second modified checklist is based on the first modified checklist;
      in response to the second upload request:
         assign a second checklist relationship to the second modified checklist, wherein the second checklist relationship defines the first modified checklist to be a parent of the second modified checklist; and
         upload the second modified checklist to the data repository;
      store, in the data repository, the plurality of transaction records, wherein each transaction record of the plurality of transaction records comprises a plurality of financial data of the plurality of users;
      store, in the data repository, a plurality of templates corresponding to the plurality of checklists; and
      store, in the data repository, the plurality of checklists.

16. The system of claim 15, further comprising
   a checklist application instance configured to:
      display the notification of the checklist to the user;
      store the checklist downloaded by the user; and
      provide a user interface configured to:
         create a new checklist,
         submit the new checklist to the checklist application system,
         modify the checklist downloaded by the user,
         submit a rating of the checklist downloaded by the user to the checklist application system, and
         submit a modified checklist to the checklist application system.

17. The system of claim 15,
   wherein the checklist comprises checklist items and a plurality of metadata, the plurality of metadata comprising a rating, a plurality of keywords, and checklist relationships.

18. The system of claim 17, wherein the checklist application system is further configured to identify the checklist of the plurality of checklists based on the transaction record by matching a keyword of the plurality of keywords in the plurality of metadata of the checklist to a transaction keyword in the transaction record.

19. The system of claim 15, wherein the checklist application system is further configured to:
   prior to identifying the checklist of the plurality of checklists based on the transaction record:
      learn a plurality of user preferences of the user; and
      refine a search of the plurality of checklists based on the plurality of user preferences.

20. The system of claim 15, wherein the checklist application system is further configured to:
   update a rating of the checklist downloaded to the user.

21. The system of claim 15, wherein identifying the checklist based on the transaction record comprises identifying a subset of the plurality of checklists.

22. The system of claim 15, wherein the plurality of actions of the user comprises a use of a financial management application on the computer device.

* * * * *